United States Patent [19]
Wolff et al.

[11] Patent Number: 5,497,236
[45] Date of Patent: Mar. 5, 1996

[54] METHOD AND APPARATUS FOR DISTORTION CORRECTION OF SCANNED IMAGES

[75] Inventors: Gregory J. Wolff, Fremont; David G. Stork, Stanford, both of Calif.

[73] Assignees: Ricoh Company Ltd., Tokyo, Japan; Ricoh Corporation, Mountain View, Calif.

[21] Appl. No.: 82,118

[22] Filed: Jun. 23, 1993

[51] Int. Cl.⁶ .......................... H04N 1/387; H04N 1/00; H04N 1/04
[52] U.S. Cl. .......................... 358/296; 358/406; 358/474
[58] Field of Search .................................... 358/296, 300, 358/406, 443, 447, 471, 474, 482, 486, 493, 497, 498, 504; 382/254, 255, 319; 355/208, 233

[56] References Cited

U.S. PATENT DOCUMENTS 4,980,720  12/1990  Seigel ...................................... 355/233
5,179,454  1/1993  Shinada .................................. 358/447
5,276,530  1/1994  Siegel ..................................... 358/406
5,390,033  2/1995  Bannai et al. ........................... 358/498

Primary Examiner—Peter S. Wong
Assistant Examiner—Eric Frahm
Attorney, Agent, or Firm—Philip H. Albert; Townsend and Townsend and Crew

[57] ABSTRACT

An improved method and apparatus for correcting for splay is provided. A document distorted by the curvature of a page of text away from a platen is converted to a digital image. The digital image is the manipulated to remove the distortion by fitting the lines of text in an unsplayed portion to a skew line, which represents the deviation of lines of text in the digital image from horizontal. Then the splay is determined for each line of text. Once the skew and the splay are determined, an inverse transformation is done to straighten the lines of text. A horizontal stretching is also applied to the text to correct for the projection angle of the original document.

17 Claims, 8 Drawing Sheets

METHOD AND APPARATUS FOR DISTORTION CORRECTION OF SCANNED IMAGES

BACKGROUND OF THE INVENTION

The present invention relates to the field of document scanning. More specifically, the present invention addresses the problems of scanning an image of a page into a photocopier or scanner when the page cannot be laid flat on a scanning bed.

Optical scanning of an image on paper for the purposes of photocopying or generation of digital image data is well known in the art. Digital image data is often represented as an array of pixels, known as a raster-scan representation. Each pixel has a position and a value, so a pixel can describe where and what color an individual dot should be when the image is printed or displayed. While the paper image need not originate on paper, since images can be on any surface, the term is used to distinguish between it and a digital image, which exists as data in a computer memory. For some applications, optics which can be moved over a paper image, by rolling or otherwise, are acceptable. However, for higher speed and higher accuracy scanning, flat-bed optics are required.

With flat-bed optics, the paper image is held onto a flat glass surface, or platen, and an electronic image in the form of analog or digital data is generated by illuminating the paper image and sensing the reflected light. Two common methods for sensing the reflected light are taking a snapshot of the image, sensing all light from the paper image at once, and scanning the paper image, sensing the light from the paper image a point or line at a time. Regardless of how the paper image is sensed, the sensing optics are focused at the plane where the paper meets the platen, so that a paper image placed against the platen is in focus with respect to the optical sensors.

Often, it is not possible to place the entire paper image against the platen, such as when the paper image is bound into a book. In such cases, the inner margin of the paper image, where the page meets the binding, will not be flush with the platen, but the paper image will gradually separate from the platen as the page nears the binding. Where the paper image separates from the platen, points on the sensed image are non-linearly distorted from the original image. This warping, or splay, is most evident where the paper image consists of straight lines of text. Due to the optics used, lines of text will appear to rise near the bottom of the page and drop near the top of the page. Also, since a page curving away from the platen presents a smaller projection to the optics than a page flat on the platen, the text also appears compressed.

Photocopiers are available where the platen is located near the edge of the photocopier, thereby allowing a book page to be placed flat on the platen while the facing pages of the book drape down the side of the photocopier. While such photocopiers have limited applications, they suffer from several drawbacks. One is that facing pages cannot be simultaneously sensed. Other problems include paper transport difficulties and copier packaging. Also, with such copiers, two facing pages cannot be copied without a user moving the book.

This problem has been partially addressed by height measuring hardware combined with adjustable optics. Such a system is shown in U.S. Pat. No. 4,980,720. In the system disclosed therein, a height sensor is used to measure the distance (in the "z" direction) from a book page to a copy machine platen as a function of the distance from the book's spline (the "x" direction). This height function is then used to adjust mirrors, lens, and light sources so that the image reflects a constant illumination, stays in focus, and is scanned at a constant speed relative to the page.

While such a system may correct for the splay of a page being copied, such a system cannot correct for the splay of the page once an image of the page has been taken. Instead, the correction must be performed as the image is captured. Since the system assumes height is not a function of the "y" direction (i.e., height is constant along a line parallel to the spline from the top to the bottom of the book) the system cannot properly correct for the splay of a page in a book when the top and bottom of the book are not at the same height. This is often the case when the user closes a copy machine cover onto the book, pressing down more heavily on the end of the book closest to the hinge of the copy machine cover.

From the above it is seen that an improved method and apparatus for correcting for splay is needed.

SUMMARY OF THE INVENTION

An improved method and apparatus for correcting for splay is provided by virtue of the present invention.

In one embodiment of a copier according to the present invention, a paper image containing image lines of text, or other lines which are horizontal in the original, on a page of a bound book is placed as near as possible to a copier platen, where photosensitive optics are focussed on the plane of the platen against which a substantial portion of the paper image is placed. The platen is then scanned or otherwise optically sensed, to create a digital image representing the paper image. The copier contains a splay correction means which comprises several parts. First, the splay corrector determines the skew of the digital image, where the skew is the deviation of image lines in the digital image from horizontal. Then the splay corrector determines the splay, or curve, of each line in the digital image. Once the skew and the splay are determined, the splay corrector performs two inverse transformations on the digital image. The first transformation vertically corrects the splay, after which the image lines are straight, but the image in the splay corrected regions remains compressed in the horizontal direction due to the reduced projection of the image relative to the platen. The second transformation corrects for this compression by horizontally expanding the text in the splay corrected regions. The inverse transformations can be performed by setting pixel color values of given pixels to the pixel color values of pixels near the transformed position of the given pixels.

While the following description, for the sake of example, applies to a sensing means which generates digital images from paper images, other forms of representation are possible, such as analog data or patterns of charge on a rotating drum. Furthermore, although description is given for a copier which optically senses a paper image and produces duplicate paper images, the present invention is applicable to any manner of copier, scanner, or photographic sensor where a paper image is sensed and converted to electrical analog or digital signals, or is otherwise used to reproduce the original image. Also, where the edge of the page is available in the image, it can be used as an image line.

A further understanding of the nature and advantages of the inventions herein may be realized by reference to the remaining portions of the specification and the attached drawings.

DESCRIPTION OF THE PREFERRED EMBODIMENTS

Figure 1:
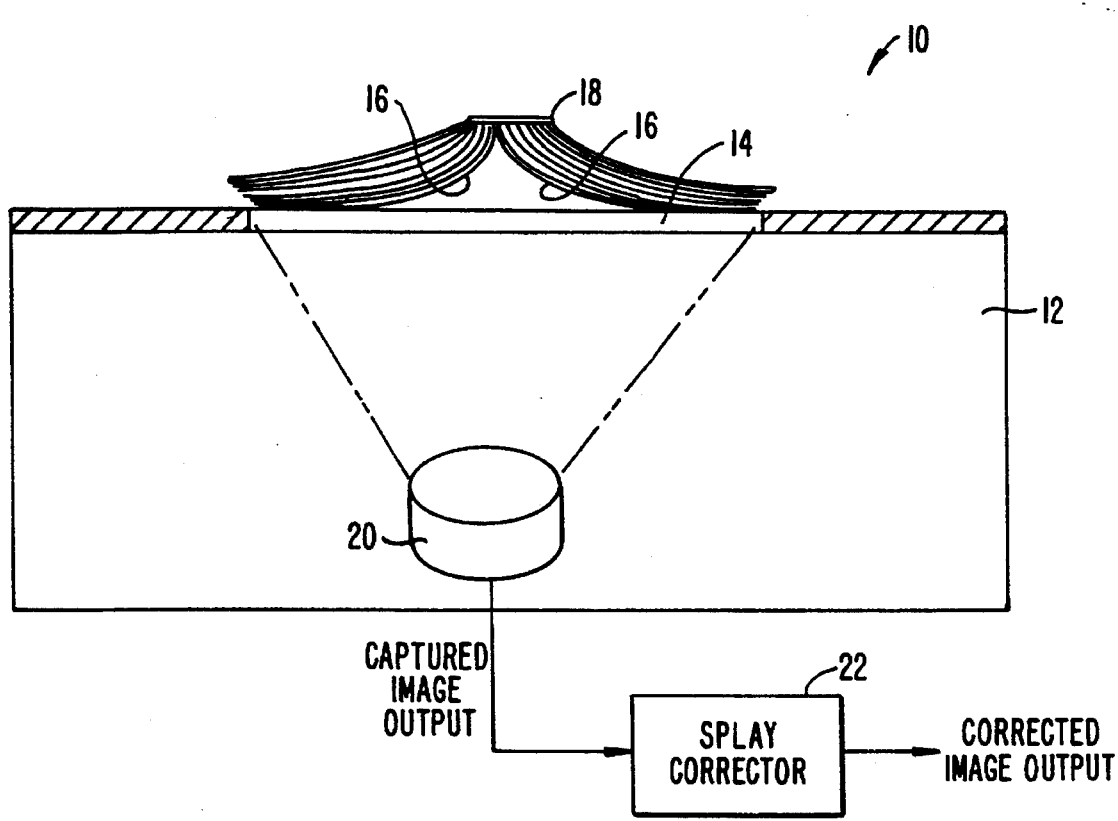
FIG. 1 is an illustration of a copier according to the present invention.

FIG. 1 illustrates an embodiment of a distortion reduction system 10 according to the present invention. The distortion reduction system 10 shown in FIG. 1 comprises a copier 12 which captures images of articles placed on platen 14. As FIG. 1 shows, because a paper 16 to be copied is bound in a book 18, paper 16 cannot lie flat on platen 14, and with an optical sensor 20 in copier 12 focussed onto the plane of platen 14, the captured image of paper 16 is distorted.

However, an embodiment of a splay corrector 22 according to the present invention receives the captured, distorted image from optical sensor 20 and outputs a corrected image according to a correction described below. The captured image is preferably digitized before being processed by splay corrector 22, however a splay corrector operating on analog data is also possible.

While FIG. 1 shows two leaves of a book being copied, the present invention is also useful where only a single page of a bound book is copied. Indeed, the invention is useful wherever binding or other arbitrary constraints prevent a page from being laid flat on platen 14. In other embodiments not shown, the document is scanned and data representing the scanned image is stored or transferred to another location for later correction of the stored image. In yet other embodiments, an already distorted copy of a page is copied (along with the distortion in the copy), and then the resulting image is corrected for the distortion.

Optical sensor 20 need not be any particular means of capture. In various embodiments, optical sensor 20 is a snapshot lens, or a scanning bar, and is typically a linear CCD array, but could also be another means of image capture not as well known in the art.

Figure 2:
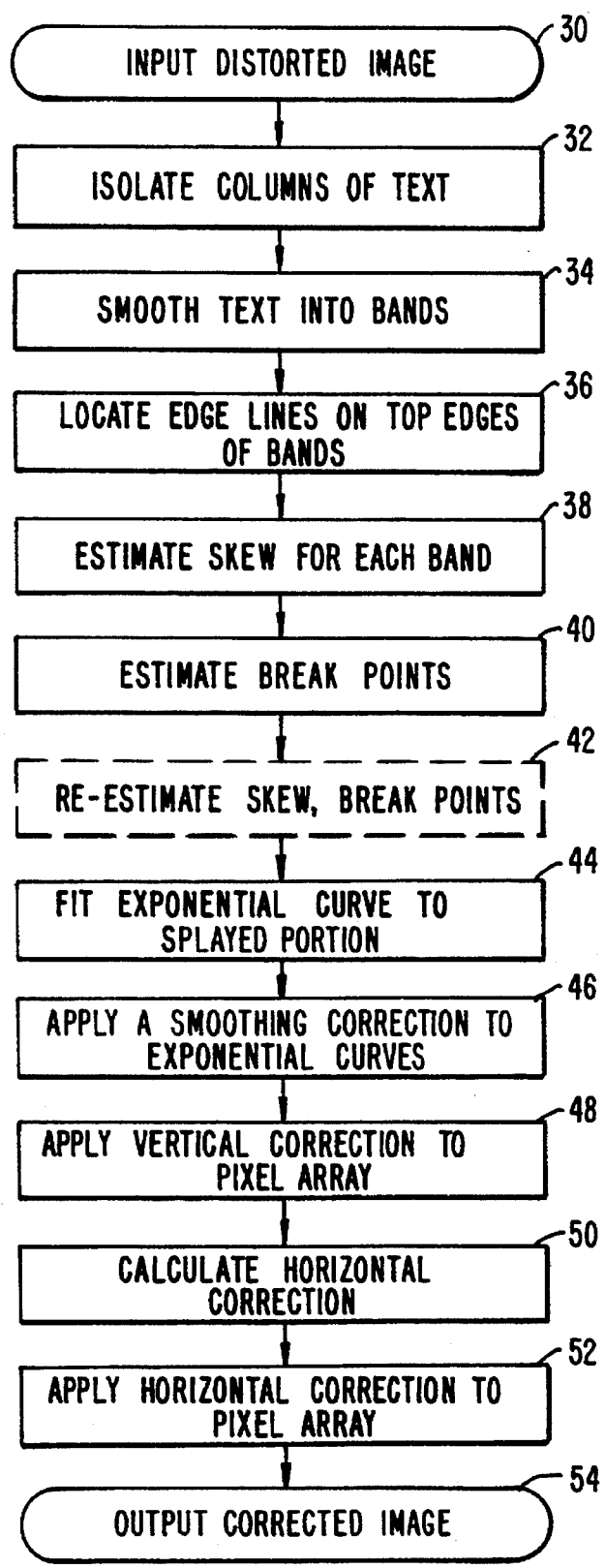
FIG. 2 is a flow chart showing one method of distortion correction according to the present invention.

FIG. 2 is a flow chart showing an example of the processing performed by splay processor 22. In splay processor 22, an input image is manipulated through the operations shown in FIG. 2, to transform an image distorted by page curvature on a platen into an undistorted image.

At block 30, an input image is accepted. If the image is not in a digital image form, it is converted to digital at this point (except for those embodiments which use analog processors). At block 32, the image is scanned to locate the boundaries of columns of text. In one embodiment, these boundaries of columns are found by scanning vertically and horizontally for bands of low pixel color variance. In some embodiments, all columns are independently corrected for splay, and in others, only the centermost columns are processed. Where the image comprises non-text elements, such as horizontal lines of a blueprint, areas equivalent to columns are identified based on the extent of the horizontal lines of the original.

Once a column is located, processing at block 34 smoothes the text in a column to form bands "highlighting" the lines of text. Although this process works for any color of text and background, the example described herein is for black text on a white background. The text is smoothed by examining horizontal lines of pixels, and changing each white dot to a black dot when the white dot is between two black dots within a horizontal window. Ideally, the window is just slightly wider than the largest space between the edges of two characters, including the space between the last character of a word and the first character of the following word. Each line of text would then be converted to a black band, with occasional ascenders and descenders rising out of the band.

In block 36, the banded image is scanned to identify the top edge of each text band, and results in a set of edge lines indicating the top edge of each text band. Of course, if the image is distorted, the edge lines might not be straight lines. The top edge of a line is found by tracing the top edge of the text band, ignoring the ascenders. In some embodiments, lines with insufficient darkness or band thickness are eliminated as spurious bands. In other embodiments, the bottom edge of a band is used, and the descenders are ignored. For this description, the edge lines will be expressed by the equation $L_i(x)$ for the "i"th edge line. By convention, references to points on the image will be referred to by x–y coordinates, with x increasing to the right and y increasing upward, and an arbitrary origin of the lower left corner of the image. For non-text lines, it may be possible, depending on how smooth the non-text lines are in the original, to make the non-text lines the edge lines without the smoothing step. For clarity, the following description refers to text lines and the correction of distortion therein. It should be understood that the following equally applies to distortion in images where the edge lines are not representative of the edge of a line of text, but may be the edge of some graphic element, or the edge of the page.

In block 38, the estimated slope of each edge line is calculated to determine whether the edge line skew should be removed (to make the image line more horizontal) before correcting for the curvature of the edge line. However, the skew need not be removed before splay correction is done. In an alternate embodiment, a single skew value for the entire page is calculated from the estimated slopes of each edge line on the page. This value is the "skew" of a edge line in the image, and can be used to rotate the image line back to horizontal.

Although the present invention is equally applicable to images with splaying on either side of the image, or in the center of a two-page image, the operation of the invention will be described with reference to an image with splaying on the right portion of the image.

One method for calculating the skew of an edge line is to find the line of best fit to the edge line. A line through the left-most point of the edge line is used as the line of fit, to simplify further calculation, however this is not required. The skew line, expressed as $$S_i(x)=S_{Ai}x+S_{Bi}$$

for the "i"th edge line described by $L_i(x)$. The skew line is usually only an estimate, since the distortion of the page causes errors in the evaluation of the skew. If the proper origin is chosen, the skew line equation can be simplified to $$S_i(x)=S_{Ai}x.$$

As defined above, a skew line is a straight line intersecting the edge line at the end of the edge line furthest from the splayed portion of the image lines and having a slope equal to the skew value. Exactly where the skew line "separates" from the edge line might be subjective, but here it is defined as the right-most crossing of the skew line and the edge line. However, due to noise in the edge lines, the break points might not be accurate using this method.

Next, in block 40, a break point, $P_i=(x_{Bi}, y_{Bi})$, is determined for each edge line i. A break point is that point in the image corresponding to the point on paper 16 where the page begins to separate from platen 14. In some embodiments, a break point is found by independently evaluating each line, and finding the point where the edge line separates from the skew line. In the example discussed herein, the break points used are the points $(x_{Bi}, y_{Bi})$ on the edge line $L_i(x)$ for which $$K_i(L_i(x)-S_i(x))>0,$$

for all $x>x_{Bi}$, where $K_i=1$ or $-1$. $K_i=1$ for edge lines which curve up, and $K=-1$ for edge lines which curve down.

In alternate embodiments, new break points are calculated from a straight line fit of all the individually calculated break points, and in other embodiments, break points are calculated by scanning a line perpendicular to the image lines from the unsplayed portion to the splayed portion until all the residues of the edge lines with the skew removed have the same sign over a page image or a half-page image. The below described method uses the first method initially, and the second method to refine certain calculations, as discussed below.

Optionally, in block 42, the skew is re-estimated by fitting a straight line not to the whole edge line, but only to the straight, or unsplayed, portion of the edge line up to the break point. If the corrected skew is significantly different from the originally estimated skew, the break point can also be re-estimated using a new skew line.

Next, in block 44, the splayed portion of each edge line is fit to an exponential curve. If the edge lines on the top half of the page curve up, and the lines on the bottom half of the page curve down, the edge lines are fit to exponential curves with a signs indicating the direction of the curve. Since, in practice, a linear fit is faster, a straight line is fit to the logarithm of the residuals. This is expressed by the following equations:

$$F_i(x)=\log(K_i(L_i(x)-S_i(x))+1)$$

$$LBF_i=A_i(x-x_{Bi})$$

where $K_i=1$ if the "i"th edge line curves up, and $K_i=-1$ if it curves down; $L_i$ is the "i"th edge line itself; $S_i$ is the skew line for the "i"th edge line; $x_{Bi}$ is the x coordinate of the break point; and $LBF_i$ is the line of best fit to the function $F_i(x)$. Thus, an exponent, $A_i$, is calculated for each edge line. The above functions are defined for the splayed portions of the edge lines, i.e., where $x>x_{Bi}$. Because the $K_i$ ($L_i(x)-S_i(x)$) term is zero at $x_{Bi}$ and greater than one everywhere else in the splay portion of the line, the best fitting line through $x_{Bi}$ will have a nonnegative slope (i.e., $A_i \geq 0$). The exponential curve of best fit for the "i"th edge line to this point is $$K_i*(\exp[A_i(x-x_{Bi})]-1)+S_i(x).$$

In block 46, a correction to these best fit curves is made, to smooth the values of $A_i$ over all the lines, which will ensure a smooth transformation of points between the edge lines. Once $A_i$ is calculated for each edge line, a line $$A'(y)=By+C$$

is fit to the points $(y_{Bi}, K_iA_i)$. In other words, although the $A_i$ values are expected to vary smoothly down the image, calculation limitations and noise might cause some values to stray from the smooth variation. Since a typical page might include lines near the top with a large upward curvature ($A_i$ large), low curvature lines in the middle ($A_i$ near zero), and high curvature lines ($A_i$ large; $A_i$ is always positive) near the bottom of the image, the $K_i$ term is used to approximate a line with all the $A_i$ values.

The line $A'(y)$ expresses the curve of an edge line as a function of its vertical position on the page, or more precisely, as a function of the position of the edge line's break point's y coordinate. Thus, the smoothed curvature value for the "i"th edge line is $A'_i=By_{Bi}+C$. Applying these values to the edge line, the exponential curve of best fit to the "i"th edge line is $$L'_i(x)=K_i*(\exp[A'(y_{Bi})(x-x_{Bi})]-1)+S_i(x)$$

and substituting $$A'(y_{Bi})=By_{Bi}+C,$$

$$L'_i(x)=K_i*(\exp[(By_{Bi}+C)(x-x_{Bi})]-1)+S_i(x).$$

These exponential curves, $L'_i(x)$, might not vary smoothly up and down the image, if the break points $(x_{Bi}, y_{Bi})$ do not vary smoothly from edge line to edge line. To account for this, an adjustment is made to the above curve of best fit, according to the second method of calculating break points, as mentioned above. First, a line, $\alpha(y)=\beta y+\gamma$ (expressed as a function of y), is fit to all the break points $(x_{Bi}, y_{Bi})$. The splayed region of the image can now be defined as the half-plane of the image to the right of the line $\alpha(y)$. Substituting $\alpha(y_{Bi})$ for $x_{Bi}$ in the expression $L'_i(x)$, the "i"th edge line is now approximated by the curve $$L'_i(x)=K_i*(\exp[A'(y_{Bi})(x-\alpha(y_{Bi}))]-1)+S_i(x)$$

for the splayed region. And, although $y \neq y_{Bi}$ over the splayed portion of edge line i, the replacement of y with $y_{Bi}$ in the above equation does not adversely affect the results of splay correction. Consequently the vertical (y-axis) distortion for any point (x, y) in the splayed region, whether or not the point is on an edge line, can be expressed as $$\Delta y=K(x, y)*(\exp[A'(y)(x-\alpha(y))]-1), \text{ or}$$

$$\Delta y=K(x, y)*(\exp[(By+C)(x-(\beta y+\gamma))]-1),$$

where K(x, y) is equal to $K_i$ of the edge line nearest the point (x, y). The skew line term, $S_i(x)$ is not present in the above equation for $\Delta y$, since the splay correction only moves the text down to the splay line. At this point, of course, the skew correction could be done. How the value of K(x, y) is determined is not critical, since K is either clearly 1 or −1 in regions of large curvature, and in the areas of low curvature, where K changes from 1 to −1, $\Delta y$ is a much smaller correction.

In block 48, the text of the original image is transformed to straight lines of text aligned with the skew lines (or aligned with the horizontal axis if the skew has been removed. Since the image is a pixel array, for each pixel at points (x, y), $\Delta y$ is calculated, and the pixel value (color) of the pixel at (x, y) is set to the pixel value of the pixel at (x, y+$\Delta y$). Where y+$\Delta y$ is not an exact pixel location, the pixel value for (x, y) is interpolated from the pixels near the point (x, y+$\Delta y$).

In block 50, a horizontal correction is calculated. The correction accounts for the horizontal compression in the original image caused by the distorted portion of paper 16 not being normal to platen 14, and thus presenting a less than full cross section to optical sensor 20. The horizontal correction maps a point (x, y) in the splayed region to the point $$(x+A'(y)*\exp[A'(y)*x]*(1-\exp[-A'(y)]), y),$$

where $A'(y)=By+C$, as derived above.

In block 52, the correction is applied to the pixel array. This step might be combined with the vertical transform done in block 48. The horizontal transform differs from the vertical transform, in that the vertical correction is given as an error to be removed from a point, and the horizontal correction is given as a correction to be added to the point. Thus, the horizontal correction is applied to the pixel array by assigning the pixel value of each point (x, y) to be the corrected point's pixel value. As with the vertical correction, if the corrected point is not located exactly on a pixel point, the pixel value of (x, y) is applied to the pixels nearby the corrected point, using standard interpolation techniques.

Finally, in block 54, the corrected image is output.

Figure 3:
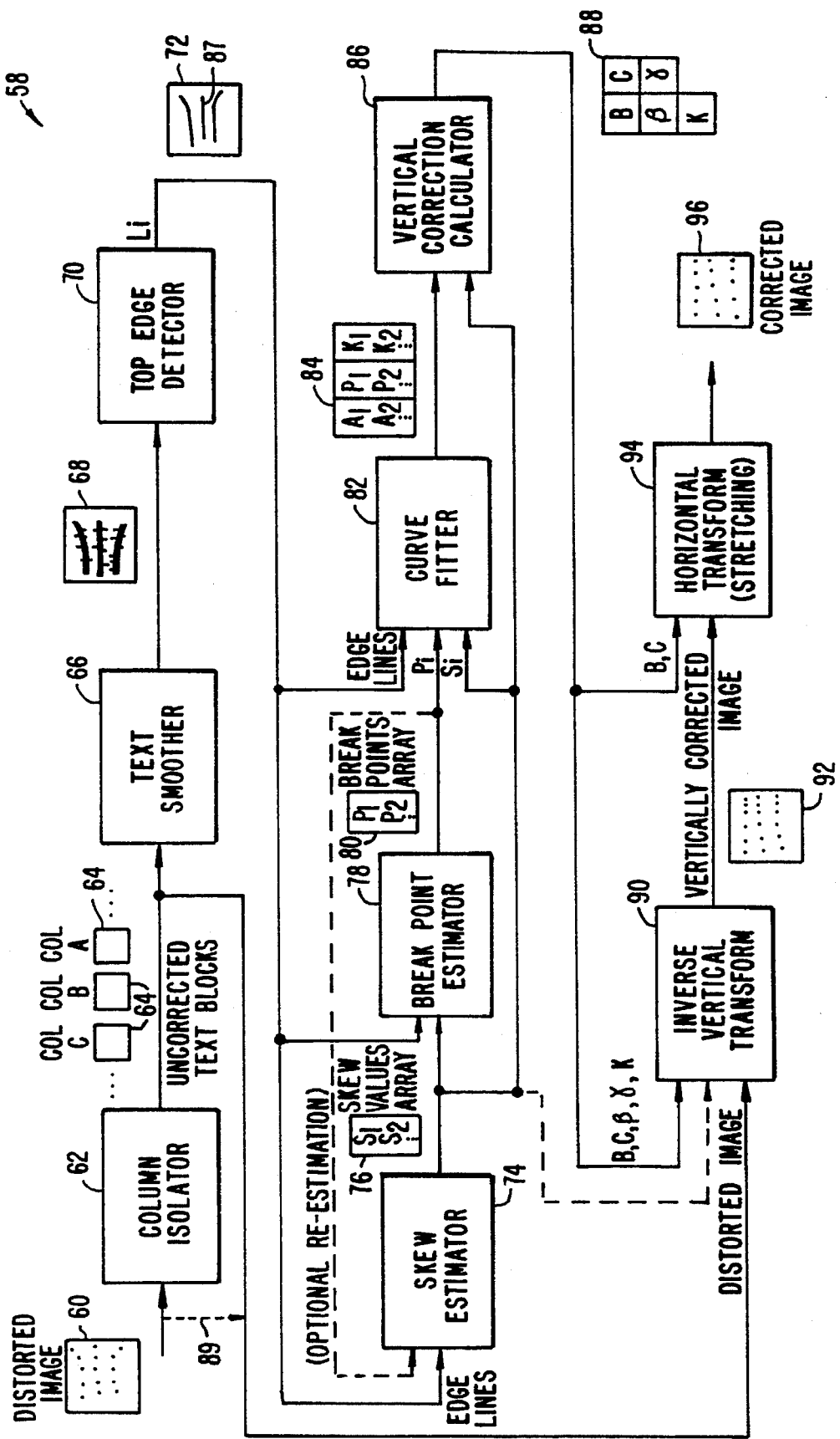
FIG. 3 is a block diagram showing an embodiment of a distortion correction apparatus according to the present invention.
Figure 4A:
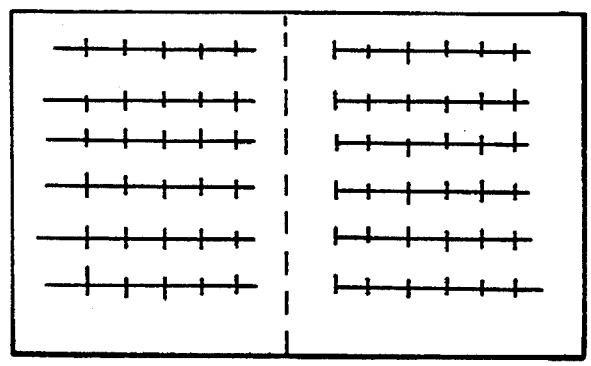
FIG. 4A is a schematic representation of an undistorted page.
Figure 4B:
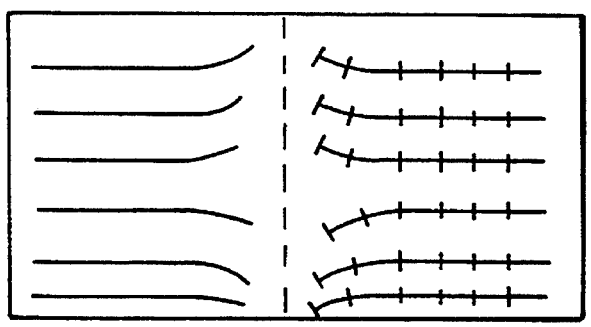
FIG. 4B is a schematic representation of an image of the page in FIG. 4A distorted by being copied while the page is curved away from the focal plane of the copier.
Figure 4C:
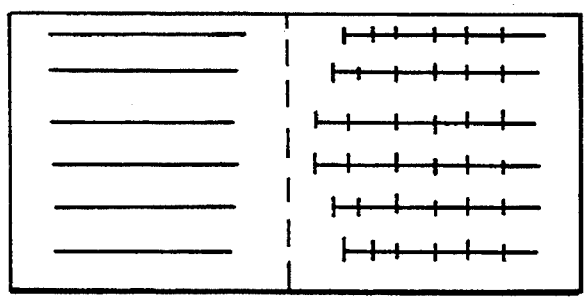
FIG. 4C is a schematic representation of the image of FIG. 4B after vertical distortion is removed.
Figure 4D:
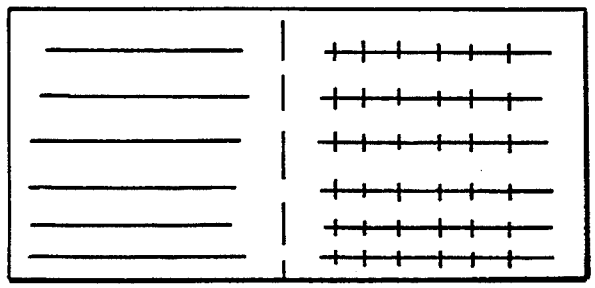
FIG. 4D is a schematic representation of the image of FIG. 4C after horizontal distortion is removed.

FIG. 3 illustrates an embodiment of a distortion correction apparatus 58 according to the present invention. In distortion correction apparatus 58, a distorted image 60 of a page of text is input to apparatus 58, and a corrected image 96 of the page is output. While FIG. 3 shows operational blocks passing data between the blocks, other variations are possible, such as a data processor operating on static blocks of data or parallel processes manipulating input images in a pipeline.

First, a column isolator 62 identifies columns of text, and serially outputs an image 64 of each separated column. Columns are identified in a number of ways. One possible means is to scan vertically and horizontally for areas of high variance in pixel color values. Text tends to result in high variance, whereas border and noisy regions tend to have low variance. Column isolator 62 outputs the columns serially to the remainder of apparatus 58, and from that point, each column is processed separately. Alternatively, only those columns near the center of a book being copied are processed for correction, while in some embodiments, the columns are processed in parallel.

The columns of text 64 are provided to a text smoother 66, which changes the color of background pixels to the foreground color for background pixels which lie in a horizontal line between two foreground pixels which are spaced apart less than a specified distance. If the specified distance is larger than the greatest distance between two characters, a line of text will be "filled in" with the foreground color, which in most applications is black. The text smoother then outputs the column as a banded image 68.

A top edge detector 70 determines where the top edge of each band in banded image 68 lies. Top edge detector 70 ignores the small variations due to noise and the text ascenders and descenders not smoothed into bands. If two lines are closer than some window, the lines are considered to be the same edge, and if a line consists of only a few points, it is discarded as a spurious line. Such discontinuities would occur due to spaces between words, and having many ascenders and descenders together. Top edge detector 70 outputs an array of edge lines 72. Although FIG. 3 shows the lines being processed as a block, each line can be processed in parallel in the remaining portions of apparatus 58 since the output of top edge detector 70 is an array of lines.

A skew estimator 74 estimates the skew, or rotation from horizontal, of each edge line. In the case where the edge lines are processed as a block, a single skew value, applicable to each edge line, can be calculated. A skew value is calculated for a single edge line by fitting the edge line to a straight line and using the slope of the straight line as the skew value. If a single value is to be output, the slopes of the straight lines can be averaged. In FIG. 3, skew estimator 74 is shown outputting an array of skew values 76, with one skew value per edge line input.

Skew values 76 are then used by a break point estimator 78, which determines where an edge line deviates from the straight line fit found by skew estimator 74. Break point estimator 78 outputs, for each edge line, a value indicating the point on the edge line where the edge line breaks away from the straight line fit. Again, if the edge lines are processed as a block, break point values can be output as a break point array 80. Alternately, break points might be represented by a substantially vertical line crossing the edge lines, the break points being the points where the edge lines are intersected by the substantially vertical lines.

Using the top edge line shown in edge line array 72, one way to detect where the edge line breaks away is to divide the edge line with a skew line for that edge line. The break point is then the right-most crossing of the skew line and the edge line. Of course, for a line which is distorted on the left, the directions are reversed. Optionally, the skew values can be re-estimated by ignoring the portions of the lines on the distorted side of the break point (i.e., the splayed portions) for the edge lines when calculating the best skew fit, and if the skew values significantly change, the break points can be re-estimated using the new skew values.

The break point values, $P_i$, the skew values, $S_i$, and the edge lines, $L_i$, feed into a curve fitter 82, which fits an exponential curve to the splayed portions of the edge lines, which in FIG. 3 is the portion of the edge line to the right of the break point. More particularly, the skew line found by skew estimator 74 is subtracted from the edge line, and the remaining variations in the splayed portion are fit to an exponential curve, by finding the best fitting exponential curve as described above in the discussion accompanying FIG. 2. Thus, the output of curve fitter 82 is an array of A, K and P values 84, where, where $A_i$ is an exponential curve coefficient for an "i"th edge line, $K_i$ is the direction of curvature of the "i"th edge line (either 1 or −1), and $P_i$ is the break point of the "i"th edge line, possibly re-estimated by curve fitter 82. Of course, more complex models or less complex models than a piecewise approximation by a straight line and exponential curve are possible. In practice, the edge line is transformed into a log space and the best fitting line to the log-transformed curve is found.

Curve fitter 82 outputs the arrays A, K and P to a vertical correction calculator 86, which uses the arrays to find values B, C, β, γ, and K for the points in the distorted image. In the example of FIG. 3, the values are output in a correction values block 88. The values, except for K are constants to be used at all points in the image. K is 1 in one region of the splayed region, and −1 in the other region; thus K can be expressed as a curve separating the two K value regions. Of course, if half a page is processed at a time, K will be constant for that half page. Alternately, the regions of different K values can be bounded by an edge line, such as edge line 87 which is part of edge line array 72.

Inverse vertical transform processor 90 applies a transformation based on $S_i$, B, C, β, γ, and K to the pixels of the distorted image. The distorted image is provided by the output of column isolator 62. If a pre-collimated image is used instead, it is supplied along an alternate path 89. The input to processor 90 is a pixel array, and the output of processor 90 is a pixel array representing vertically corrected (i.e., substantially flat) text, although a horizontal compression, due to the angle of paper 16 and platen 14, remains. To effect the transformation, the pixel color value of a point at coordinates (x, y) in the vertically corrected image is set equal to the pixel color value of a point in the distorted image at the distorted coordinates $$(x, y-K(x, y)*(\exp[(By+C)(x-(\beta y+\gamma))]-1)),$$

and if a pixel is not mapped exactly at the distorted coordinates (which is generally the case), values from pixels mapped near the distorted coordinates are used. For example, suppose the pixel value (color) for the pixel at (x, y) is to be determined, and the corresponding distorted coordinates are (x, y'), which falls between the two pixels mapped at (x, $y_f$) and (x, $y_c$), the floor and ceiling pixels, respectively, of the point (x, y'). In a typical pixel array, if a pixel is mapped to a particular x or y coordinate, other pixels are also mapped to that coordinate, in other words, for a pixel-mapped point (x, y), pixel-mapped points (x, $y_f$) and (x, $y_c$) can usually be found. Further assume that the pixel value at (x, $y_f$) and (x, $y_c$), are $P_f$ and $P_c$, respectively. With those assumptions, the estimated pixel value at the point (x, y'), which is the corrected pixel value for (x, y) is $$P_{xy'} = \frac{y}{y_c - y_f} P_f + \left(1 - \frac{y}{y_c - y_f}\right) P_c.$$

Once vertically transformed, the vertically corrected text is output as a vertically corrected image 92.

Horizontal transform processor 94 accepts vertically corrected text image 92 and the values B and C output by vertical correction calculator 86. If the curvature of paper 16 in the splayed portion of the image can be modelled by an exponential curve of the form of $e^{Ax}$, then each point (x, y) in image 92 should be mapped to a horizontally corrected point $$(x', y) = \left(\int_0^x \sqrt{1 + A^2 e^{2Av}}\, dv, y\right)$$

in a horizontally corrected image 96. However, in one embodiment, for simplicity, the integral is approximated, and the point (x, y) is mapped to the approximate horizontally corrected point $$(x', y) = (x + (Ae^{Ax} - Ae^{A(x-1)}), y)$$

in horizontally corrected image 96. As discussed in connection with FIG. 2, the horizontal transformation is expressed as a correction, rather than as a distortion, so the transform is done in the opposite direction from the vertical transform. For example, a given point (x, y) is "moved" to the horizontally corrected point (x', y), by applying the pixel value of (x, y) to the points ($x_c$, y) and ($x_f$, y), which are the ceiling and floor pixel points, respectively, which surround the point (x', y) when it does not map a pixel exactly. The application of the value of (x, y) to the pixels at ($x_c$, y) and ($x_f$, y) is weighted by the distance from (x', y) to the ceiling and floor pixel points.

FIG. 4 schematically shows more details of the transformations performed by apparatus 58. FIG. 4A shows an undistorted page. FIG. 4B shows an image of the page distorted by the page being lifted from platen 14. Each line representing a line of text in the figure is punctuated by cross-hairs to show the horizontal distortion of the lines of text. FIG. 4C shows an image after vertical correction, and FIG. 4D shows the image after vertical and horizontal correction. In an alternate embodiment, the vertical and horizontal corrections are done at one time to the image, so no image similar to that of FIG. 4C is produced, although it exists in embodiments which process the corrections serially.

Figure 5:
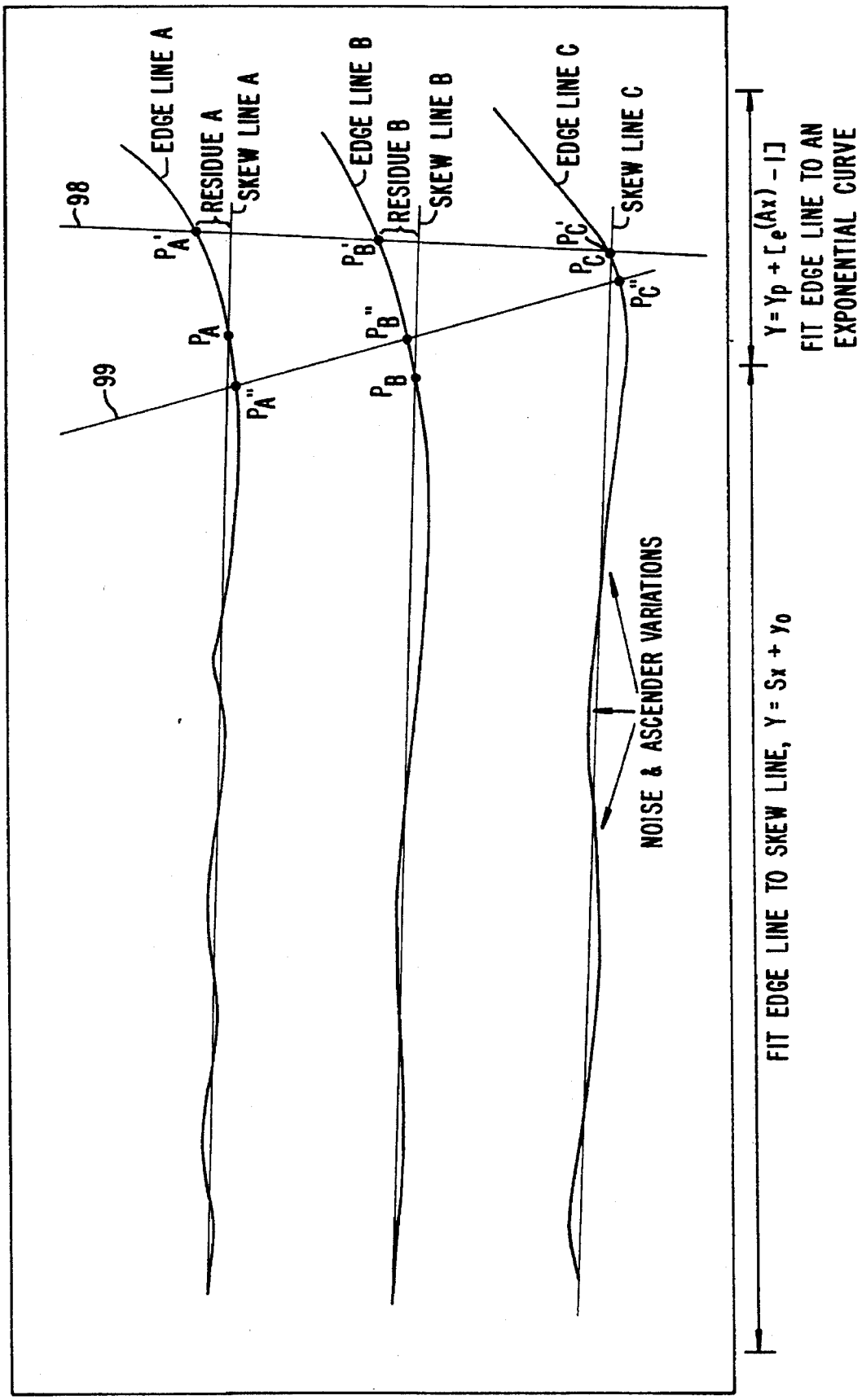
FIG. 5 is a diagram showing the relationships between edge lines, skew lines, and break points.

FIG. 5 shows three edge lines, A, B, and C, three skew lines and break points determined from various methods. $P_{A-C}$ were determined individually, as being the points furthest to the right at which the skew lines intersect the edge lines. $P_{A-C}'$ are the points of intersection of a line 98 and the edge lines. Line 98 is a line which is perpendicular to an average skew line, and is the line furthest to the left for which all the edge lines intersect line 98 above their respective skew lines. $P_{A-C}''$ are the points of intersection between the edge lines and a line 99, where line 99 is the straight line best fit to the points $P_{A-C}$.

Figure 6A:
FIG. 6(a) is an illustration of a page of text with skew.

FIG. 6(a) is an illustration of a page of text with skew. Without the present invention, copies produced by a copier of a page from a book would appear as in FIG. 6(a), with the characteristic curvature due to the book not being laid flat on the copier platen.

Figure 6B:
FIG. 6(b) is the page of FIG. 6(a) with a correction region identified.

FIG. 6(b) shows the area over which the correction process is to be performed, which is a subset of the area of FIG. 6(a), with margins, dark areas, and opposing page excluded.

Figure 6C:
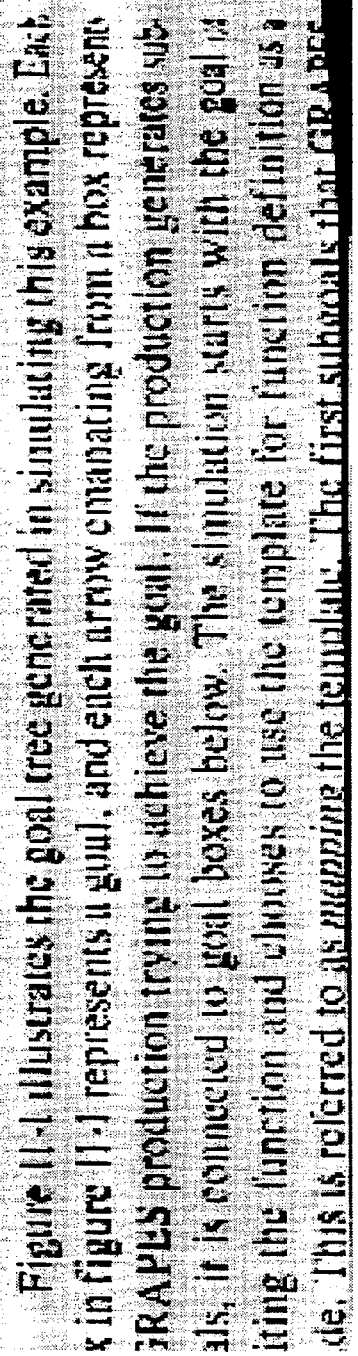
FIG. 6(c) is the region shown in FIG. 6(b) after a correction is applied.

FIG. 6(c) is the region shown in FIG. 6(b) after a correction is applied. This figure illustrates how the image is corrected so that the lines of text are straight, as in the original, and the image near the binding is uncompressed to match the original.

The above description is illustrative and not restrictive. Many variations of the invention will become apparent to those of skill in the art upon review of this disclosure. Merely by way of example, the invention could be implemented as software routines processing a data file, as digital hardware processing electrical signals, or a dedicated signal processor integral to a copying machine, although not all possible implementations are discussed herein. The scope of the invention should, therefore, be determined not with reference to the above description, but instead should be determined with reference to the appended claims along with their full scope of equivalents.

What is claimed is:

1. A distortion correction apparatus for correcting distortion in a distorted image of a page caused by the page not being fully aligned with an image capture surface at the time the distorted image is captured, comprising:

input means, for accepting the distorted image and formatting the distorted image into a form processable by the distortion correction apparatus;

a line locator coupled to said input means, for identifying paths of each of a plurality of lines within the distorted image;

a coefficient generator coupled to said line locator, for generating, from said paths, coefficient values representative of distortion of said plurality of lines;

a transform means coupled to said coefficient generator and said input means, for transforming the distorted image into a corrected image according to a transformation dictated by a predetermined relation among said coefficient values; and output means coupled to said transform means, for outputting said corrected image, wherein said corrected image comprises an image of the page with less spatial distortion than the spatial distortion in the distorted image.

2. The apparatus of claim 1, wherein said line locator locates lines of text and further comprises:

a column identifier for identifying columnar regions in the distorted image, wherein said column identifier outputs a text image comprising a column of text lines;

a text smoother for generating a banded image from said text image, wherein each band in said banded image corresponds to one of said text lines in said text image; and an edge detector for generating an edge line array from said banded image, wherein each edge line in said edge line array corresponds to one of said bands in said banded image, and wherein said edge line array represents said paths of each of said plurality of text lines.

3. The apparatus of claim 1, wherein said coefficient generator further comprises:

an apportioning means for apportioning each of said paths into a splayed portion and an unsplayed portion separated by a break point;

a first modelling means coupled at least to said apportioning means, for modelling said unsplayed portion as a straight line; and a second modelling means coupled at least to said apportioning means, for modelling said splayed portion as an exponential curve.

4. The apparatus of claim 3, wherein said apportioning means comprises a break point locator which locates said break point by fitting a straight line to an image line, said break point being a point of intersection of said straight line and said image line which is closer to the more distorted end of said image line than any other point of intersection.

5. The apparatus of claim 1, wherein the distorted image is captured using an optical sensor in a photocopying machine.

6. The apparatus of claim 1, wherein said transform means comprises a vertical transform means and a horizontal transform means.

7. The apparatus of claim 1, wherein said input means comprises means for identifying columns of text and for outputting said columns in series to said line locator, whereby each column of text in the distorted image is separately corrected for distortion.

8. The apparatus of claim 1, wherein said input means formats the distorted image into a two-dimensional array of digital pixel values.

9. The apparatus of claim 1, wherein said predetermined relation is a modelling of an image line comprising a portion modelled by a straight line and another portion modelled by an exponential curve.

10. A distortion correction apparatus for correcting distortion in a distorted image of a page caused by the page not being fully aligned with an image capture surface at the time the distorted image is captured, comprising:

a column identifier for identifying columnar regions in the distorted image, wherein said column identifier outputs a text image comprising a column of lines of text;

a text smoother for generating a banded image from said text image, wherein each band in said banded image corresponds to one of said lines of text in said text image;

an edge detector for generating an edge line array from said banded image, wherein each edge line in said edge line array corresponds to one of said bands in said banded image;

a coefficient generator for generating from said edge line array coefficient values representative of distortion in said text image;

a transform means coupled to said coefficient generator and said column identifier, for transforming said text image into a corrected image according to a transformation dictated by a predetermined relation among said coefficient values; and output means coupled to said transform means, for outputting said corrected image, wherein said corrected image comprises an image of the page with less spatial distortion than the spatial distortion in the distorted image.

11. A method of correcting for distortion in an image of a text page where said distortion is caused by the text page not being fully aligned with an image capture surface at the time the distorted image is captured, comprising the steps of:

capturing the distorted image in a form processable by a distortion correction apparatus;

locating a text line path for each of a plurality of text lines within the distorted image;

identifying a break point for each of said plurality of text lines, where a break point for a given text line separates an undistorted portion of said given text line from a distorted portion of said given text line;

fitting a straight line to said undistorted portion;

fitting an exponential curve to said distorted portion;

generating an inverse transform for said given text line, where said inverse transform derives from coefficients of said break point, said straight line, and said exponential curve for said given line, and said inverse transform of said given text line better approximates a straight line of text than said given text line before said inverse transform is applied;

transforming said given text line according to said inverse transform; and outputting a corrected image comprising at least a transform of said given text line, wherein said corrected image comprises an image of the page with less spatial distortion than the spatial distortion in the distorted image.

12. The method of claim 11, wherein said step of locating a text line path further comprises the steps of:

identifying columnar regions in the distorted image;

separating said columnar regions into at least one text image;

smoothing said at least one text image into a banded image, wherein each band in said banded image corresponds to a text line in said at least one text image; and locating an edge line for each of said bands, wherein said edge line represents said text line path.

13. The method of claim 11, wherein said step of generating an inverse transform further comprises:

apportioning each of said text line locations into a splayed portion and an unsplayed portion separated by a break point;

modelling said unsplayed portion as a straight line; and modelling said splayed portion as an exponential curve.

14. The method of claim 13, wherein said step of apportioning further comprises the steps of locating said break point by fitting a straight line to said text line, said break point being a point of intersection of said straight line and said text line which is closer to the more distorted end of said text line than any other point of intersection.

15. The method of claim 11, further comprising the step of initially capturing the distorted image using an optical sensor in a photocopying machine.

16. The method of claim 11, wherein said step of transforming a text line further comprises the steps of:

vertically transforming said text line into a vertically transformed text line; and horizontally transforming said vertically transformed text line.

17. A method of correcting for distortion in an image of a page photocopied from a bound book, the bound book preventing the page from being laid flat on a platen glass of a photocopier, comprising the steps of:

a) capturing an image of the page using conventional photocopying techniques, thereby producing a copied image;

b) locating at least one column of text in said copied image, said at least one column of text characterized by a region of relatively high variance in pixel values between regions of relatively low variance in pixel values;

c) transforming each line of text in said at least one column of text, said step of transforming comprising the steps of:

1) identifying an edge line corresponding to a line of text to be transformed;

2) identifying a skew line for said edge line, said skew line being a straight line of best fit to points comprising said edge line;

3) locating a break point on said edge line, said break point being a point which separates an unsplayed portion of said edge line from a splayed portion, said unsplayed portion being substantially modelled by said skew line, and said splayed portion being substantially nonlinear;

4) fitting an exponential curve to said splayed portion, wherein said exponential curve is represented by at least one coefficient;

5) fitting a horizontal linear correction to deviations of said at least one coefficient from a linear function of a vertical position of said splayed portion;

6) transforming said line of text according to a vertical inverse transform derived from said skew line, said exponential curve, and said horizontal linear correction, to form a vertically corrected line of text;

7) horizontally correcting said vertically corrected line of text according to a predetermined function of said at least one coefficient derived in said step of fitting an exponential curve, to form a transformed line of text; and d) assembling each transformed line of text into a corrected image, whereby said corrected image comprises an image of the page with less spatial distortion than the copied image.

\* \* \* \* \*